US006156251A

United States Patent [19]

Habighorst

[11] Patent Number: 6,156,251

[45] Date of Patent: Dec. 5, 2000

[54] METHOD AND PLANT FOR THE MANUFACTURE OF COMPOSITE MATERIALS HAVING A STRUCTURED SURFACE AT ONE SIDE

[75] Inventor: Christoph Habighorst, Springe, Germany

[73] Assignee: Kvaerner Panel Systems GmbH, Springe, Germany

[21] Appl. No.: 09/189,312

[22] Filed: Nov. 10, 1998

[30] Foreign Application Priority Data

Nov. 11, 1997 [DE] Germany .......................... 197 49 849

[51] Int. Cl.[7] ...................................................... B29C 43/22

[52] U.S. Cl. .......................... 264/118; 425/363; 425/371

[58] Field of Search .................................... 264/118, 119; 425/371, 363, 364 R

[56] References Cited

U.S. PATENT DOCUMENTS 5,085,812 2/1992 Ahrweliler et al. .................... 425/371

*Primary Examiner*—Mary Lynn Theisen
*Attorney, Agent, or Firm*—Townsend and Townsend and Crew LLP

[57] ABSTRACT

The invention relates to a method and to a plant for the manufacture of board-like composite materials having a surface structure at one side in which particles containing lignocellulose and/or cellulose, such as for example wood chips, wood fibers and the like, are mixed with at least one mineral binder, aggregate substances and water into a scatterable mixture. This mixture is formed on a continuously moved support into an endless mat, which passes, together with plate-like structure formers arranged end to end, into a continuously operating belt press. Thereafter provision is made for dividing up the length of board or mats obtained into individual sections, and for separating the plate-like structure formers from the individual boards or mats and returning them in a circuit into their starting position, while the individual boards or mats are subjected to a subsequent further hardening, curing and conditioning process. In this way considerable savings in investment and operating costs result.

16 Claims, 2 Drawing Sheets

1
2
3
4
5
6
7
8
9
10
11
12
13
14
15
16
17
18
19
20
21

METHOD AND PLANT FOR THE MANUFACTURE OF COMPOSITE MATERIALS HAVING A STRUCTURED SURFACE AT ONE SIDE

BACKGROUND OF THE INVENTION

1. Field of the Invention

The invention relates to a method for the manufacturing of composite materials having a structured surface at one side, wherein particles containing lignocellulose and/or cellulose, such as, for example, wood chips, wood fibers and the like, are mixed with at least one mineral binder, water and optionally aggregate substances into a mixture which is capable of being scattered and this mixture is formed on a continuously moved support into an endless mat, with the surface of the support confronting the mat having a surface structure or with a structure giving means being applied onto the surface of the formed mat. After carrying out a pressing process and also selectable further treatment steps, the structure formers, which have been separated from the composite material which has been surface structured at one side, are returned into their starting positions. Furthermore, the invention is directed to a plant for carrying out this method.

2. Description of the Prior Art

In the manufacture of cement-bound chip board with a structured surface it is known to place plate-like structure formers end to end onto the mat in the working direction after the machine which forms the fleece, with the structure formers then being pressed together with a respective mat section in accordance with the customary stack pressing process.

It is also known to connect plate-like structure formers with sheet metal mat transport trays and to scatter the mat particles directly onto the relief-like moldings of the plate-like structure formers (BISON report of May 1993, pages 28/29; brochure BISON-DURIPANEL Plants for Wood Cement Construction Boards, D 954 204 005-0575/01). Thereafter, the individual mat sections which are each provided with a plate-like structure former are stacked in mobile clamping frames into packets which are compressed one after the other using a cover in the clamping frame in a discontinously operating single storey board press. Once the clamped dimension has been obtained, the press opens and the packet fixed in the mobile clamping frame can pass into a hardening channel and thereafter into a destacking plant, which unlocks the pressed packet and alternately separates the individually obtained boards with a surface structure at one side from the plate-like structure formers. While the movable clamping frames and plate-like structure formers are moved back in a circuit into their starting positions, the boards which have been surface structured at one side can be pretrimmed to shape and optionally ground before they cure in curing stores and finally pass through a conditioning channel.

The invention is based on the object of providing a method of the initially named kind, by which the one-sided and diversely surface structured plate-like composite materials can be manufactured with substantially less cost and expenditure.

BRIEF DESCRIPTION OF THE INVENTION

In order to satisfy this object, the invention provides the teaching, a) to continuously press the endless mat provided with plate-like structure formers arranged end to end into a board or into a mat which does not spring back resiliently, b) to divide up the so pressed mat into individual sections in the region of the points of abutment of the board-like structure formers with a relief-like surface structuring in the manner of a wood grain, slate, a sandstone structure or a fanciful structure or the like, c) to separate the boards or mats from these structure formers or to separate the structure formers from the boards or mats that are obtained, and d) to return the plate-like structure formers in the circuit into their starting position and to subject the boards or mats which are obtained to a further treatment known per se.

In contrast to the known method, the basic concept of the invention thus lies in omitting the mobile clamping frames, the discontinuously operating single storey board press and the destacking after the hardening channel, which were previously considered necessary, and instead to proceed in accordance with the method steps a) to d). In this way, a considerable saving in investment and operating costs results, particularly since the number of plate-like structure formers which are present in the circuit with the same universal relief-like surface structuring can be kept small.

A plant for carrying out the method of the invention comprises a scattering station, an endless mat carrier, a supply means for plate-like structure formers, a pressing station, a dividing up means for a length of board or mat, an apparatus for the separating of the boards or mats obtained after the subdivision of the length of board or mat from the plate-like structure formers and also an apparatus for returning the plate-like structure formers to the supply means.

DETAILED DESCRIPTION OF THE PREFERRED EXEMPLARY EMBODIMENTS

Figures 1, 2:
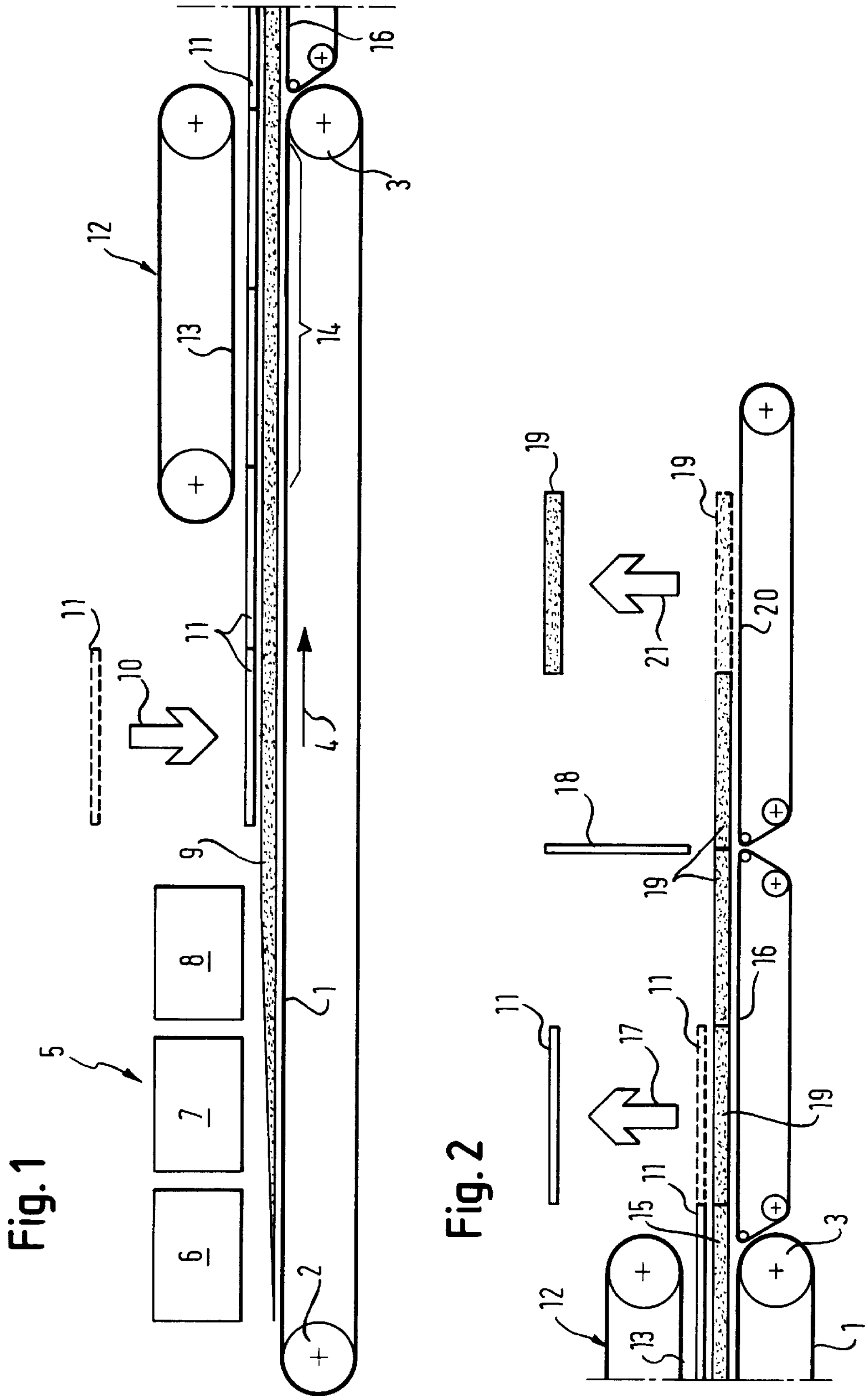
FIG. 1 is a schematic side view of a plant formed in accordance with the invention for the manufacture of board-like composite materials, which have a surface structure at one side.
FIG. 2 is a schematic side view of a further part of the plant as an extension of the subject of FIG. 1.

A mat carrier consisting in accordance with FIG. 1 of an endless belt 1 is guided over deflection rollers 2, 3, of which the deflection roller 3 is driven. This mat carrier moves continuously in the direction of the arrow 4.

Above the mat carrier 1 there is a schematically illustrated scattering station, designated generally with the reference numeral 5. This can admittedly, in principal, be any desired scattering station, a three-head scattering station is, however, preferably used. The three-head scattering station includes a wind-sifting scattering chamber 6 for the formation of the lower cover layer, a middle layer scattering chamber 7 and a wind-sifting scattering chamber 8 for the formation of the upper cover layer of the endless mat 9. The components of the endless mat 9 are composed of a scatterable starting mixture, which contains particles of lignocellulose and/or cellulose, such as, for example, wood chips, wood fibers and/or the like, to which have been added at least one mineral binder, aggregate substances and water.

Suitable mineral binders are gypsum, cement, selenitic cement pozznolane. For the adjustment of the first start of solidification, a retarder such as, for example, tartaric acid or citric acid and/or an easily water soluble alkali salt is used. In contrast, preparations such as, for example, aluminous cement, sulphatic granulate and, in particular, compounds containing light metals, including sodium aluminate or lithium carbonate, are used to accelerate the reaction having regard to a high early and final strength. By matching such preparations which influence the curing, the processing time of the scatterable starting mixture or of the endless mat 9 can be ideally set.

FIG. 1 indicates that plate-like structure formers 11 are placed after the scattering station 5 onto the endless mat 9 in the direction of the arrow 10 by a non-illustrated supply means, with the structure formers 11 being arranged end to end in the direction of the arrow 4. The endless mat 9, which is provided in this manner with plate-like structure formers 11, then runs through a continuously operating belt press 12, which has an upper endless belt 13 and a part 14 of the endless belt 1. The endless mat 9 is pressed to the predetermined thickness in the press gap of this press, is subjected to surface structuring and is either brought to the required high strength in the course of a few minutes in the context of the accelerated hydration process or, however, a structured mat which does not spring back resiliently is produced, which is subsequently stored or cured (curing chamber, autoclave) to achieve its strength (hydraulic reaction of the binder).

From FIG. 2 one can see the transfer of the length of board 15 obtained from the endless mat 9, together with the plate-like structure formers 11 at the outlet of the press 12 onto an endless belt 16, which is guided over deflection rolls and non-illustrated drive rolls. Here, the separation of the plate-like structure formers 11 from the length of board 15 takes place by means of non-illustrated suction manipulators or the like in the direction of the arrow 17. Thereafter, the plate-like structure formers 11 are returned on endless belts, roller tracks or the like in a circuit into their starting position, which lies between the scattering station 5 and the continuously operating belt press 12. During this, an apparatus 18 divides up the length of board 15 into individual boards 19, which are transported onto an endless belt 20 guided over deflection rollers and non-illustrated drive rollers before they are transferred in the direction of the arrow 21 into stations for the further treatment.

Figure 3:
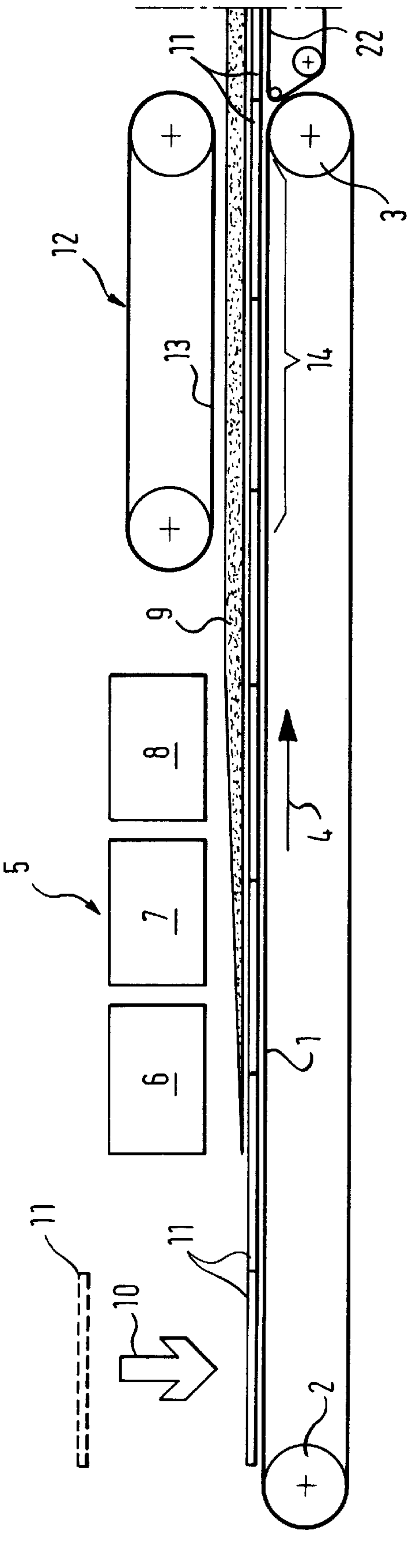
FIG. 3 is a modified embodiment of the invention.
Figure 4:
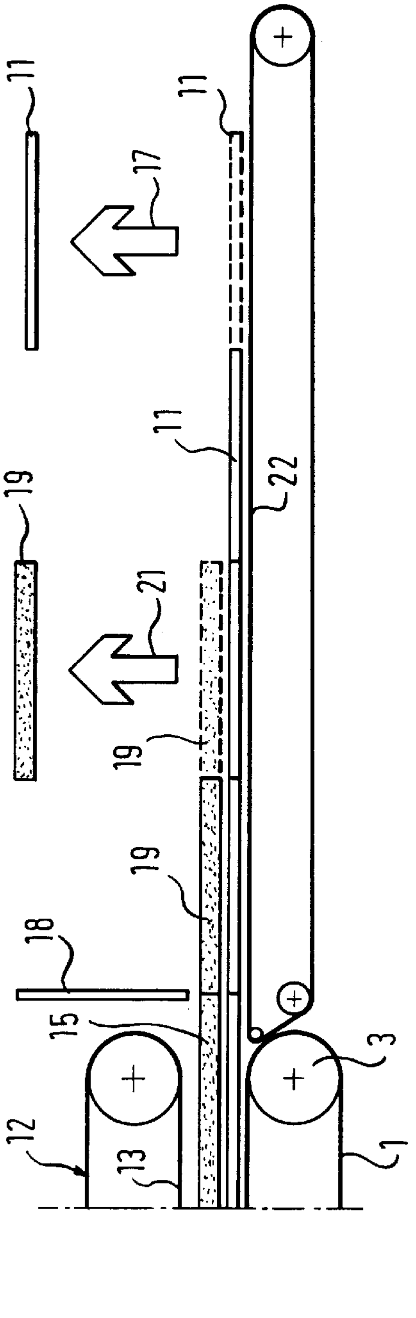
FIG. 4 is a schematic side view as an extension of the plant of FIG. 3.

In the FIGS. 3 and 4, parts or arrow directions which are the same as in FIGS. 1 and 2 are correspondingly designated with the same reference numerals.

The embodiment of the invention of FIGS. 3 and 4 is distinguished from that of FIGS. 1 and 2 in that plate-like structure formers 11 are first placed in the direction of the arrow 10 onto the endless belt 1, onto which an endless mat 9 is then formed with the end to end arrangement of the structure formers 11 in the lower region of the scattering station. As a consequence, a further distinction then arises at the outlet end of the continuously operating belt press 12, after the dividing up of the length of board 15 which is obtained into individual boards 19 by a co-moving dividing apparatus 18. This further distinction comprises a reverse sequence of the transporting away of the individual boards 19 and of the plate-like structure formers 11 from a single endless belt 22 guided over deflection rolls and non-illustrated drive rolls.

What is claimed is:

1. A method of manufacturing composite materials having a structured surface at one side, wherein particles containing at least one of lignocellulose and cellulose are mixed with at least one mineral binder, water and optionally aggregate substances into a mixture which is capable of being scattered and this mixture is formed on a continuously moved support into an endless mat, with the surface of the support confronting the mat having a surface structure or with a structure giving means being applied onto the surface of the formed mat, wherein a) plate-like structure formers with a relief-like surface structuring in the matter of wood grain, slate, sandstone or a fanciful structure are used, which are placed end to end onto the endless mat or onto the support, b) the endless mat together with the plate-like structure formers are pressed in a continuous pressing process into a board or into a mat which does not spring back resiliently, c) the mat which has been pressed in this way is split in the region of the points of abutment of the plate-like structure formers into individual board or mat sections, d) the boards or mats which are obtained are separated from the plate-like structure formers or these structure formers are separated from the obtained boards or mats, and e) the plate-like structure formers are returned in a circuit into their starting position and the boards or mats separated from the structure formers are further treated.

2. A method in accordance with claim 1, wherein the boards or mats separated from the structure formers are subjected to at least one of storage, hardening, curing and conditioning processes.

3. A method in accordance with claim 1, wherein gypsum, cement and selenitic cement pozznolane are used as mineral binder.

4. A method in accordance with claim 1, wherein the presence of preparations for influencing the curing are in the scatterable mixture.

5. A method in accordance with claim 4, wherein curing retarders, comprising at least one of tataric acid, citric acid, an easily water-soluble alkali salt and curing accelerators are provided.

6. A method in accordance with claim 1, wherein the particles consist of at least one of wood chips and wood fibers.

7. A method in accordance with claim 5, wherein the curing accelerators consist of one of aluminous cement and sulfatic granulate.

8. A method in accordance with claim 5, wherein the curing accelerators consist of compounds containing light metals including sodium aluminate or lithium carbonate.

9. A plant for manufacturing composite materials having a structured surface at one side, the plant comprising a scattering station, an endless mat carrier, a supply means for plate-like structure formers, a pressing station, a dividing up means for a length of board or mat, an apparatus for the separating of the boards or mats obtained after the subdivision of the length of board or mat from the plate-like structure formers, and an apparatus for returning the plate-like structure formers to the supply means, wherein the pressing station is formed as a continuously operating belt press for the pressing of the endless mat together with the plate-like structure formers, which are arranged end to end on one side of the mat, wherein an apparatus for the dividing up of the pressed endless mat into a string of boards or mats follows the belt press, wherein an apparatus for the separation of the boards of the string of boards or the mats of the string of mats from the plate-like structure formers and vise versa is provided, and wherein an apparatus is present for the return of the plate-like structure formers to a supply means for the plate-like structure formers.

10. A plant in accordance with claim 9, wherein at least one of a storage region, a hardening channel, a conditioning channel and a maturing store are provided for the further treatment of the plates or mats separated from the structure formers.

11. A plant in accordance with claim 9, wherein the dividing up apparatus for the forming of the string of plates or mats is either arranged in front of the station for the separation of the plate-like structure formers from the string of boards or mats, or is arranged after the station for the separation of the plate-like structure formers from the string of boards or mats.

12. A plant in accordance with claim 11, wherein the separation apparatus for the boards or mats from the plate-like structure formers and vice versa and the supply means for the plate-like structure formers consist of a suction manipulator.

13. A plant in accordance with claim 9, wherein the continuously operating belt press includes an upper endless belt and apart of the endless belt.

14. A plant in accordance with claim 9, wherein either a plurality of endless belts with a dividing up apparatus provided in the transfer region between two endless belts are arranged following the continuously operating belt press, or an endless belt for receiving the already divided up board or mat string and the structure formers is used and removal devices for the boards and the structure formers are associated with this endless belt.

15. A plant in accordance with claim 9, wherein the plate-like structure formers are brought on endless belts, or roller tracks in the circuit into their starting position before or after the scattering station.

16. A plant in accordance with claim 9, wherein the mats which do not spring back resiliently are brought into at least one of an intermediate store, into a hardening chamber and into an autoclave.

* * * * *